Figure 1:
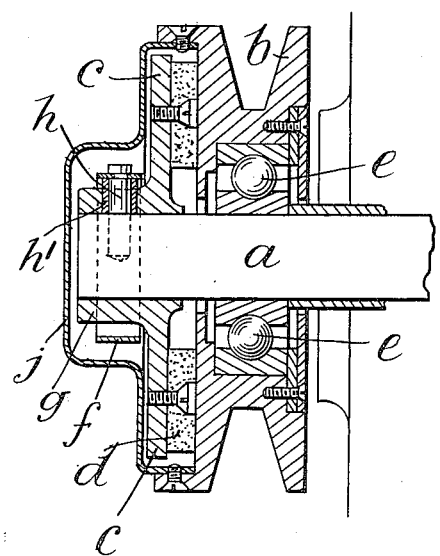

F. E. WILSON & W. A. SHEPHERD.
CLUTCH FOR CONVEYING ROTARY MOTION.
APPLICATION FILED SEPT. 18, 1915.

1,174,920.

Patented Mar. 7, 1916.

Inventors:-
Frank Ernest Wilson
and Walter Arnold Shepherd
by H. B. Willson & Co
Attorneys Witnesses:-
H. Woodard

UNITED STATES PATENT OFFICE.

FRANK ERNEST WILSON AND WALTER ARNOLD SHEPHERD, OF BIRMINGHAM, ENGLAND.

CLUTCH FOR CONVEYING ROTARY MOTION.

1,174,920.   Specification of Letters Patent.   Patented Mar. 7, 1916.

Application filed September 18, 1915. Serial No. 51,432.

*To all whom it may concern:*

Be it known that we, FRANK ERNEST WILSON and WALTER ARNOLD SHEPHERD, subjects of the King of Great Britain and Ireland, residing at the corner of Chester street and Avenue Road, Birmingham, England, have invented certain new and useful Improvements in Clutches for Conveying Rotary Motion, of which the following is a specification.

This invention for improvements in clutches for conveying rotary motion relates to friction clutches which are adapted to allow of slip or lost motion to regulate the torque transmitted, such slip or lost motion being produced by the action of the torque on a spring which normally retains the friction faces of the driving and driven members of the clutch in operative contact, but allows them to be forced apart by a cam action when the driving torque increases above a given maximum.

Our invention is characterized mainly by the fact that the power is transmitted through the spring thereby giving more sensitive control than if the spring were acting merely as a compression spring bearing axially against one of the clutch members as heretofore, and has for its object to provide an improved clutch of this character that shall effectively prevent the torque on the driven member from exceeding a predetermined maximum which can be readily varied at will according to the load to be imposed on said driven member.

Our invention is applicable generally where it is desired to maintain the load on the driven part more or less constant or the speed more or less uniform notwithstanding possible fluctuations in the drive, and is particularly applicable to dynamos used in lighting motors driven vehicles, or any other dynamos or machines requiring to be driven at constant speed or with uniform load.

According to our invention the driven member of the clutch is connected with the driven shaft by a spring through which the power is conveyed to the driven shaft in such manner that when the resistance of the load on the driven shaft exceeds the maximum torque which the spring is able to transmit without change of form, a relative rotary movement of the driven member of the clutch on the driven shaft results and this movement is utilized to free or partly free the driven member from the driving member of the clutch to allow of slip.

We will now describe one way of carrying out our invention which is given merely as an example as we do not desire to limit ourselves to any particular construction to the exclusion of others embodying the principle of our invention.

Figure 2:
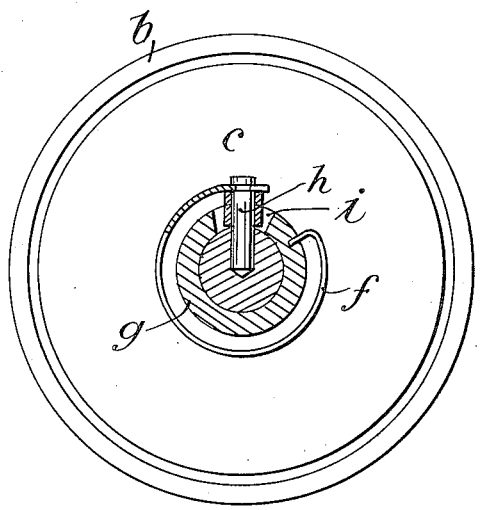
Figure 3:
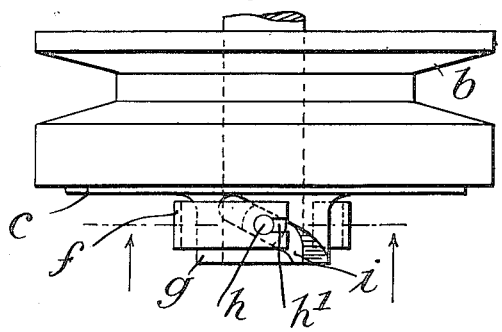

In the accompanying drawings Figure 1 is a longitudinal section of a clutch constructed according to this invention. Fig. 2 is an end elevation partly in section with an end cover portion omitted, and Fig. 3 is a plan also with the end cover plate omitted.

As shown, the clutch is applied to the shaft $a$ of a dynamo used in vehicle lighting and driven by belt gearing from the same source of power as the vehicle. One member of the clutch consists of the drive pulley $b$ and the other member consists of a disk or plate $c$ adapted to be clutched to the pulley member $b$ through the medium of an interposed fiber or friction disk $d$. The drive pulley $b$ is mounted to rotate freely on the shaft $a$ on ball bearings $e$ while the driven disk or plate $c$ is mounted loosely on the dynamo shaft $a$ but coupled thereto by a spring $f$ which is fixed at one end in a boss or sleeve $g$ on the disk $c$ and at the other end to a pin $h$ fixed in the shaft. Pin $h$ projects through a helical slot $i$ in the boss $g$ and carries a loose collar $h^1$ which is a sliding fit in the slot. A closing cap or cover $j$ is fixed to the pulley $b$. The spring normally coöperates with the pin $h$ and helical slot $i$ to force the clutch disk $c$ into clutching engagement with the pulley $b$, the strength of the spring being arranged to correspond with the de-clutching load. It will be evident, therefore, that the clutch will remain in action so long as this load is not exceeded, the drive being transmitted through the spring. Should, however, the spring be overcome by an undesired increase in the load, the driven shaft will be permitted to lag behind the clutch so that the clutch will rotate forward relatively to the shaft. Owing to this relative movement the driven member $c$ of the clutch will be acted upon by the pin $h$ which by its movement in the slot $i$ will bring about an axial movement of the member $c$, thus throwing it out of engagement with the driving member *b*. Automatic clutching and de-clutching would take place intermittently when necessary, the torque controlling the clutching action. If the number of lamps supplied with current by the dynamo were varied the output of the dynamo could be correspondingly varied by suitably setting the springs of the clutch to take a reduced or increased load.

The clutch herein described is also applicable to those cases where the dynamo is run as a motor to start the engine. In this case, the shaft *a* would be the drive shaft and would tend to move the pin *h* toward the outer end of the slot *i* thus forcing the clutch members positively into engagement until the drive was taken up by the engine and transmitted to the shaft through the clutch member and spring.

What we claim and desire to secure by Letters Patent is:—

1. An improved friction clutch wherein the driven member of the clutch is connected with the driven shaft by a spring which transmits the power of the drive but allows of a relative rotary movement of the driven member when the load overcomes the spring and means for utilizing such movement to free or partly free the driven member from the driving member of the clutch, substantially as and for the purpose described.

2. An improved clutch consisting of a drive pulley member, a driven member comprising a disk or plate coöperating with the pulley member and coupled to the shaft by a spring, and a pin in the shaft engaging a slot in the driven member suitably shaped to impart an axial movement to the driven member when said member is rotated relatively to the shaft for the purpose set forth.

3. In combination with an improved friction clutch comprising a driving clutch member, a driven member, a driven shaft, a spring connecting said driven clutch member with said shaft for transmitting power and allowing a relative rotary movement of the driven clutch member when the load overcomes the spring, and means for utilizing said movement to free or partly free the driven member of the clutch from the driving member thereof.

In testimony whereof we have affixed our signatures, in presence of two witnesses.

FRANK ERNEST WILSON.
WALTER ARNOLD SHEPHERD.

Witnesses:
 ERNEST HARPER,
 GEORGE DEALEY.